US012775773B2

(12) United States Patent
Lorenzini et al.

(10) Patent No.: US 12,775,773 B2
(45) Date of Patent: Oct. 27, 2026

(54) MODEL-DRIVEN APPROACH FOR FAILURE MODE, EFFECTS, AND DIAGNOSTIC ANALYSIS (FMEDA) AUTOMATION FOR HARDWARE INTELLECTUAL PROPERTY OF COMPLEX ELECTRONIC SYSTEMS

(71) Applicant: ARTERIS, INC., Campbell, CA (US)

(72) Inventors: Stefano Lorenzini, Montigny-le-bretonneux (FR); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 747 days.

(21) Appl. No.: 18/301,248

(22) Filed: Apr. 16, 2023

(65) Prior Publication Data

US 2023/0342538 A1 Oct. 26, 2023

Related U.S. Application Data

(60) Provisional application No. 63/334,665, filed on Apr. 25, 2022.

(51) Int. Cl.
*G06F 30/398* (2020.01)
*G06F 115/02* (2020.01)
(Continued)

(52) U.S. Cl.
CPC ........ *G06F 30/398* (2020.01); *G06F 2115/02* (2020.01); *G06F 2117/02* (2020.01); *G06F 2119/02* (2020.01)

(58) Field of Classification Search
CPC ..................................................... G06F 30/398
(Continued)

(56) References Cited

U.S. PATENT DOCUMENTS 5,485,396 A 1/1996 Brasen et al.
5,541,849 A 7/1996 Rostoker et al.
(Continued)

FOREIGN PATENT DOCUMENTS

CN 105187313 B 5/2018
CN 109587081 A 4/2019
(Continued)

OTHER PUBLICATIONS

Anonymous: “Intel Hyperflex Architecture HighPerformance Design Handbook”, Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.
(Continued)

*Primary Examiner* — Eric D Lee
(74) *Attorney, Agent, or Firm* — Dana Legal Services; Jubin Dana

(57) ABSTRACT

Failure mode, effects, and diagnostic analysis (FMEDA) is performed on hardware Intellectual Property (IP) of an electronic system. The analysis includes accessing a library of safety library components, each safety library component containing failure mode characterizations and safety data about a hardware model; and compiling the safety library components and the hardware IP. The compiling includes mapping instances of hardware models in the hardware IP to corresponding safety library components and aggregating the characterizations and safety data of the corresponding components.

12 Claims, 5 Drawing Sheets

(51) Int. Cl.
*G06F 117/02* (2020.01)
*G06F 119/02* (2020.01)

(58) Field of Classification Search
USPC .......................................................... 716/106
See application file for complete search history.

(56) References Cited

U.S. PATENT DOCUMENTS

| | | | |
|---|---|---|---|
| 5,623,420 | A | 4/1997 | Yee et al. |
| 5,638,288 | A | 6/1997 | Deeley |
| 5,761,078 | A | 6/1998 | Fuller et al. |
| 5,887,670 | A | 3/1999 | Tabata et al. |
| 5,903,886 | A | 5/1999 | Heimlich et al. |
| 5,983,277 | A | 11/1999 | Heile et al. |
| 6,002,857 | A | 12/1999 | Ramachandran |
| 6,134,705 | A | 10/2000 | Pedersen et al. |
| 6,145,117 | A | 11/2000 | Eng |
| 6,249,902 | B1 | 6/2001 | Igusa et al. |
| 6,321,363 | B1 | 11/2001 | Huang et al. |
| 6,360,356 | B1 | 3/2002 | Eng |
| 6,378,121 | B2 | 4/2002 | Hiraga |
| 6,421,321 | B1 | 7/2002 | Sakagawa et al. |
| 6,437,804 | B1 | 8/2002 | Ibe et al. |
| 6,449,761 | B1 | 9/2002 | Greidinger et al. |
| 6,622,225 | B1 | 9/2003 | Kessler et al. |
| 6,883,455 | B2 | 4/2005 | Maeda et al. |
| 6,907,591 | B1 | 6/2005 | Teig et al. |
| 7,096,436 | B2 | 8/2006 | Bednar et al. |
| 7,398,497 | B2 | 7/2008 | Sato et al. |
| 7,587,687 | B2 | 9/2009 | Watanabe et al. |
| 7,788,625 | B1 | 8/2010 | Donlin et al. |
| 8,042,087 | B2 | 10/2011 | Murali et al. |
| 8,302,041 | B1 | 10/2012 | Chan et al. |
| 8,819,611 | B2 | 8/2014 | Philip et al. |
| 9,184,998 | B2 | 11/2015 | Xue |
| 9,262,359 | B1 | 2/2016 | Noice et al. |
| 9,444,702 | B1 | 9/2016 | Raponi et al. |
| 9,569,574 | B1 | 2/2017 | Khan et al. |
| 9,792,397 | B1 | 10/2017 | Nagaraja |
| 9,825,779 | B2 | 11/2017 | Ruymbeke et al. |
| 9,940,423 | B2 | 4/2018 | Lescure |
| 10,068,047 | B1 | 9/2018 | Finn |
| 10,282,502 | B1 | 5/2019 | BShara et al. |
| 10,348,563 | B2 | 7/2019 | Rao et al. |
| 10,460,062 | B2 | 10/2019 | Feld et al. |
| 10,733,350 | B1 | 8/2020 | Prasad et al. |
| 10,853,545 | B1 * | 12/2020 | Nardi ...................... G06F 30/30 |
| 10,922,471 | B2 | 2/2021 | Baeckler et al. |
| 10,990,724 | B1 | 4/2021 | Cherif et al. |
| 11,121,933 | B2 | 9/2021 | Cherif et al. |
| 11,281,827 | B1 | 3/2022 | Labib et al. |
| 11,449,655 | B2 | 9/2022 | Cherif et al. |
| 2003/0093765 | A1 | 5/2003 | Lam et al. |
| 2004/0040007 | A1 | 2/2004 | Harn |
| 2004/0230919 | A1 | 11/2004 | Balasubramanian et al. |
| 2005/0073316 | A1 | 4/2005 | Graham |
| 2005/0268258 | A1 | 12/2005 | Decker |
| 2007/0156378 | A1 | 7/2007 | McNamara |
| 2007/0157131 | A1 | 7/2007 | Watanabe et al. |
| 2007/0174795 | A1 | 7/2007 | Lavagno et al. |
| 2007/0186018 | A1 | 8/2007 | Radulescu et al. |
| 2008/0046854 | A1 | 2/2008 | Tang |
| 2008/0049753 | A1 | 2/2008 | Heinze et al. |
| 2008/0279183 | A1 | 11/2008 | Wiley et al. |
| 2008/0291826 | A1 | 11/2008 | Licardie et al. |
| 2009/0031277 | A1 | 1/2009 | Mcelvain et al. |
| 2009/0313592 | A1 | 12/2009 | Murali et al. |
| 2010/0061352 | A1 | 3/2010 | Fasolo et al. |
| 2010/0162189 | A1 | 6/2010 | Lavagno et al. |
| 2010/0218146 | A1 | 8/2010 | Platzker et al. |
| 2010/0274785 | A1 | 10/2010 | Procopiuc et al. |
| 2011/0170406 | A1 | 7/2011 | Krishnaswamy |
| 2012/0013509 | A1 | 1/2012 | Wisherd et al. |
| 2012/0311512 | A1 | 12/2012 | Michel et al. |
| 2013/0174113 | A1 | 7/2013 | Lecler et al. |
| 2013/0208598 | A1 | 8/2013 | Nakaya et al. |
| 2013/0258847 | A1 | 10/2013 | Zhang et al. |
| 2013/0283226 | A1 | 10/2013 | Ho et al. |
| 2014/0115218 | A1 | 4/2014 | Philip et al. |
| 2014/0126572 | A1 | 5/2014 | Hutton et al. |
| 2014/0153575 | A1 | 6/2014 | Munoz |
| 2014/0156826 | A1 | 6/2014 | Chang et al. |
| 2014/0160939 | A1 | 6/2014 | Arad et al. |
| 2014/0169173 | A1 | 6/2014 | Naouri et al. |
| 2014/0204735 | A1 | 7/2014 | Kumar et al. |
| 2014/0211622 | A1 | 7/2014 | Kumar et al. |
| 2014/0298281 | A1 | 10/2014 | Varadarajan et al. |
| 2014/0321839 | A1 | 10/2014 | Armstrong |
| 2015/0036536 | A1 | 2/2015 | Kumar et al. |
| 2015/0106778 | A1 | 4/2015 | Mangano et al. |
| 2015/0121319 | A1 | 4/2015 | Hutton et al. |
| 2015/0178435 | A1 | 6/2015 | Kumar |
| 2015/0254325 | A1 | 9/2015 | Stringham |
| 2015/0341224 | A1 | 11/2015 | Van et al. |
| 2015/0347641 | A1 | 12/2015 | Gristede et al. |
| 2016/0103943 | A1 | 4/2016 | Xia et al. |
| 2016/0275213 | A1 | 9/2016 | Tomita |
| 2016/0321390 | A1 | 11/2016 | Bozman et al. |
| 2017/0060204 | A1 | 3/2017 | Gangwar et al. |
| 2017/0063734 | A1 | 3/2017 | Kumar |
| 2017/0132350 | A1 | 5/2017 | Janac |
| 2017/0177778 | A1 | 6/2017 | Lescure |
| 2017/0193136 | A1 | 7/2017 | Prasad et al. |
| 2018/0115487 | A1 | 4/2018 | Thubert et al. |
| 2018/0144071 | A1 | 5/2018 | Yu et al. |
| 2018/0227180 | A1 | 8/2018 | Rao et al. |
| 2019/0012909 | A1 | 1/2019 | Mintz |
| 2019/0073440 | A1 | 3/2019 | Farbiz et al. |
| 2019/0205493 | A1 | 7/2019 | Garibay et al. |
| 2019/0246989 | A1 | 8/2019 | Genov et al. |
| 2019/0251227 | A1 | 8/2019 | Fink |
| 2019/0260504 | A1 | 8/2019 | Philip et al. |
| 2019/0363789 | A1 | 11/2019 | Lee et al. |
| 2020/0092230 | A1 | 3/2020 | Schultz et al. |
| 2020/0162335 | A1 | 5/2020 | Chen et al. |
| 2020/0234582 | A1 | 7/2020 | Mintz |
| 2020/0366607 | A1 | 11/2020 | Kommula et al. |
| 2021/0203557 | A1 | 7/2021 | Cherif et al. |
| 2021/0226887 | A1 | 7/2021 | Mereddy |
| 2021/0320869 | A1 | 10/2021 | Bourai et al. |
| 2021/0409284 | A1 | 12/2021 | Cherif et al. |
| 2022/0294704 | A1 | 9/2022 | Lescure et al. |

FOREIGN PATENT DOCUMENTS

| | | | |
|---|---|---|---|
| CN | 113051215 | A | 6/2021 |
| CN | 113055219 | A | 6/2021 |
| DE | 102015014851 | A1 | 5/2016 |
| EP | 3842987 | A1 | 6/2021 |
| EP | 4024262 | A1 | 7/2022 |
| EP | 4057179 | A1 | 9/2022 |

OTHER PUBLICATIONS

James C. Tiernan. 1970. An efficient search algorithm to find the elementary circuits of a graph. Commun. ACM 13, 12 (Dec. 1970), 722-726. https://doi.org/10.1145/362814.362819.

Ken Eguro et al.: "Simultaneous Retiming and Placement for Pipelined Net lists", Proceedings of the 16th International Symposium On Field-Programmable Custom Computing Machines, Apr. 14, 2008 (Apr. 14, 2008), pp. 139-148, XP031379339.

U.S. Appl. No. 17/134,384, filed Dec. 26, 2020, Federico Angiolini.

U.S. Appl. No. 17/665,578, filed Feb. 6, 2022, K. Charles Janac.

"A distributed interleaving scheme for efficient access to wideIO dram memory", Seiculescu Ciprian, Benini Luca, De Micheli Giovanni, Codes+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Hervé Tatenguem Fankem, Federico Angiolini, Mikkel

(56) References Cited

OTHER PUBLICATIONS

Stensgaard, Tobias Bjerregaard, Davide Bertozzi A Vertically Integrated and Interoperable Multi-Vendor Synthesis Flow for Predictable NoC Design in Nanoscale Technologies.
ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.
Alessandro Pinto et al, "System level design paradigms", ACM Transactions On Design Automation of Electronic Systems, ACM, New York, Ny, US, (Jun. 7, 2004), vol. 11, No. 3, doi:10.1145/1142980.1142982, ISSN 1084-4309, pp. 537-563, XP058222500.
Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
Anonymous: "Network on a chip—Wikipedia", Jun. 15, 2021, https://en.wikipedia.org/w/index.php?title=Network_on_a_chip&oldid=1028654828.
Bo Huang et al, "Application-Specific Network-on-Chip synthesis with topology-aware floorplanning", Integrated Circuits and Systems Design (SBCCI), 2012 25th Symposium On, IEEE, (Aug. 30, 2012), doi:10.1109/SBCCI.2012.6344421, ISBN 978-1-4673-2606-3, pp. 1-6, XP032471227.
David Atienza et al, Network-on-Chip Design and Synthesis Outlook, Science Direct, Integration the VLSI, journal 41 (2008) 340-359.
Dumitriu Vet Al: "Throughput-Oriented Noc Topology Generation and Analysis for High Performance SoCs", IEEE Transactions On Very Large Scale Integration (VLSI) Systems, IEEE Service Center, Piscataway, NJ, USA, vol. 17, No. 10, Oct. 1, 2009 (Oct. 1, 2019), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference On, IEEE, Piscataway, NJ, USA, May 25, 2009 (May 25, 2009), pp. 425-429, XP031482069, ISBN: 978-1-4244-2799-4 abstract* * p. 426-p. 429 *.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Haytham Elmiligi et al: "Networks-on-chip topology optimization subject to power, delay, and reliability constraints", IEEE International Symposium On Circuits and Systems. May 30, 2010, pp. 2354-2357, DOI: 10.1109/ISCAS.2010.5537194.
Jain R. et al: "Predicting system-level area and delay for pipelined and nonpipelined designs", IEEE Transactions On Computer Aided Design of Integrated Circuits and Systems, vol. 11, No. 8, Jan. 1, 1992, pp. 955-965, DOI: 10.1109/43.149767.
Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.
Jingye Xu et al.: "Latch Based Interconnect Pipelining For High Speed Integrated Circuits", Proceedings of the International Conference On Electro/Information Technology, May 1, 2006, pp. 295-300, DOI: 10.1109/EIT.2006.252152.
Jun Minje et al: "Exploiting Implementation Diversity and Partial Connection of Routers in Application-Specific Network-on-Chip Topology Synthesis", IEEE Transactions On Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.
K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.
Murali et al: "Synthesis of Predictable Networks-on-Chip-Based Interconnect Architectures for Chip Multiprocessors", IEEE Transactions On Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.
Partha et al., Design, Synthesis, and Test of Networks on Chips, IEEE (Year: 2005).
Picornell Tomas Tompic@Gap.Upv.Es et al: "Dcfnoc A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Saponara S et al: "Design and coverage-driven verification of a novel network-interface IP macrocell for network-on-chip interconnects", Microprocessors and Microsystems, vol. 35, No. 6 , pp. 579-592, XP028255708, ISSN: 0141-9331, DOI: 10.1016/J.MICPR0.2011.06.005.
Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331, DOI: 10.1016/J.MICPRO.2016.04.008.
Song Z et al: "A NoC-Based High Performance Deadlock Avoidance Routing Algorithm", Computer and Computational Sciences, 2008. IMSCCS '08. International Multisymposiums On, IEEE, Piscataway, NJ, USA, Oct. 18, 2008, pp. 140-143, XP031411025, ISBN: 978-0-7695-3430-5.
Srinivasan K et al, "Linear programming based techniques for synthesis of network-on-chip architectures", Computer Design: VLSI in Computers and Processors, 2004. ICCD 2004. Proceedings. IEEE International Conference On San Jose, CA, USA Oct. 11-13, 2004, Piscataway, NJ, USA, IEEE, (Oct. 11, 2004), doi: 10.1109/ICCD.2004.1347957, ISN 978-0-7695-2231-9, pp. 422-429, XP010736641.
Srinivasan Murali et al: "Mapping and physical planning of networks-on-chip architectures with quality-of- service guarantees", Proceedings of The 2005 Asia and South Pacific Design Automation Conference, Jan. 18, 2005, DOI: 10.1145/1120725.1120737.
Tobias Bjerregaard et al: "A Router Architecture for Connection-Oriented Service Guarantees in the Mango Clockless Network-on-Chip", Proceedings of the IEEE Conference and Exhibition On Design, Automation, and Test in Europe, Mar. 7, 2005, DOI: 10.1109/DATE.2005.36.
Wei Zhong et al: "Floorplanning and Topology Synthesis for Application-Specific Network-on-Chips", IEICE Transactions On Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference On ASIC, Nov. 3, 2015, pp. 1-4, DOI: 10.1109/ASICON.2015.7516952.
Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium On Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.
Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA, IEEE, Jul. 10, 2006 (Jul. 10, 2006), pp. 213-218, XP010928275, DOI: 10.1109/IOLTS.2006.38 ISBN: 978-0-7695-2620-1.

* cited by examiner

MODEL-DRIVEN APPROACH FOR FAILURE MODE, EFFECTS, AND DIAGNOSTIC ANALYSIS (FMEDA) AUTOMATION FOR HARDWARE INTELLECTUAL PROPERTY OF COMPLEX ELECTRONIC SYSTEMS

CROSS REFERENCE TO RELATED APPLICATIONS

The present application claims the benefit of U.S. PROVISIONAL APPLICATION Ser. No. 63/334,665 filed on Apr. 25, 2022 by Stefano LORENZINI et al. and titled SYNTHESIS TOOL FOR AUTOMATIC GENERATION OF SCALABLE AND REUSABLE FAILURE MODE, EFFECTS, AND DIAGNOSTIC ANALYSIS (FMEDA) IN COMPLEX SYSTEM-ON-CHIP (SoC), the entire disclosure of which is incorporated herein by reference.

TECHNICAL FIELD

The present technology is related to failure mode, effects, and diagnostic analysis (FMEDA) of hardware intellectual property (IP). The FMEDA may be performed on the hardware IP of a system-on-chip (SoC) or other complex electronic systems.

BACKGROUND

Failure mode, effect and diagnostics analysis (FMEDA) refers to a systematic analysis technique to obtain subsystem and product level failure rates, failure modes, and diagnostic capability. This technique may be utilized during the design of a system-om-chip (SoC) or other complex electronic system. For instance, an initial design of an SoC may be generated by assembling many instances of hardware models or intellectual property (IP) blocks into top-level hardware IP. FMEDA may be performed on the hardware IP.

FMEDA may involve generating a spreadsheet or other table. Rows of failure mode information for each hardware model are manually cut and pasted into a spreadsheet. Each row corresponds to a failure mode of an instance in the hardware IP. Each instance might have multiple failure modes, so there might be multiple rows associated with a single instance. After the table has been completed, algorithms may be applied to the FMEDA table to obtain system and subsystem failure rates, failure modes and diagnostic capability.

The hardware IP will typically undergo multiple design iterations and frequent design changes. FMEDA is also performed on the revised hardware IP, which means the table is revised multiple times to reflect the changes. Additionally, revisions or multiple FMEDA iterations can be caused by: a) IP reconfiguration through hardware (e.g. Verilog) parameters; and b) derivation of new IP from RTL models reused by other IPs.

Manually generating and revising the FMEDA table is painstaking, slow, and inefficient. It is especially painstaking, slow and inefficient for the design of an SoC, which is highly configurable and which may undergo many revisions during design. Therefore, what is needed is a system and method that enables analysis containing failure mode characterizations and safety data about a hardware model and compiling the safety library components and the IP hardware.

SUMMARY

In accordance with various embodiments and aspects of the invention, systems, articles, and computer-implemented are used to perform Failure mode, effect and diagnostics analysis (FMEDA) on hardware intellectual property (IP) of electronic systems. The analysis includes accessing a library of safety library components, each safety library component containing failure mode characterizations and safety data about a hardware model; and compiling the safety library components and the hardware IP. The compiling includes mapping instances of hardware models in the hardware IP to corresponding safety library components and aggregating the characterizations and safety data of the corresponding components.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
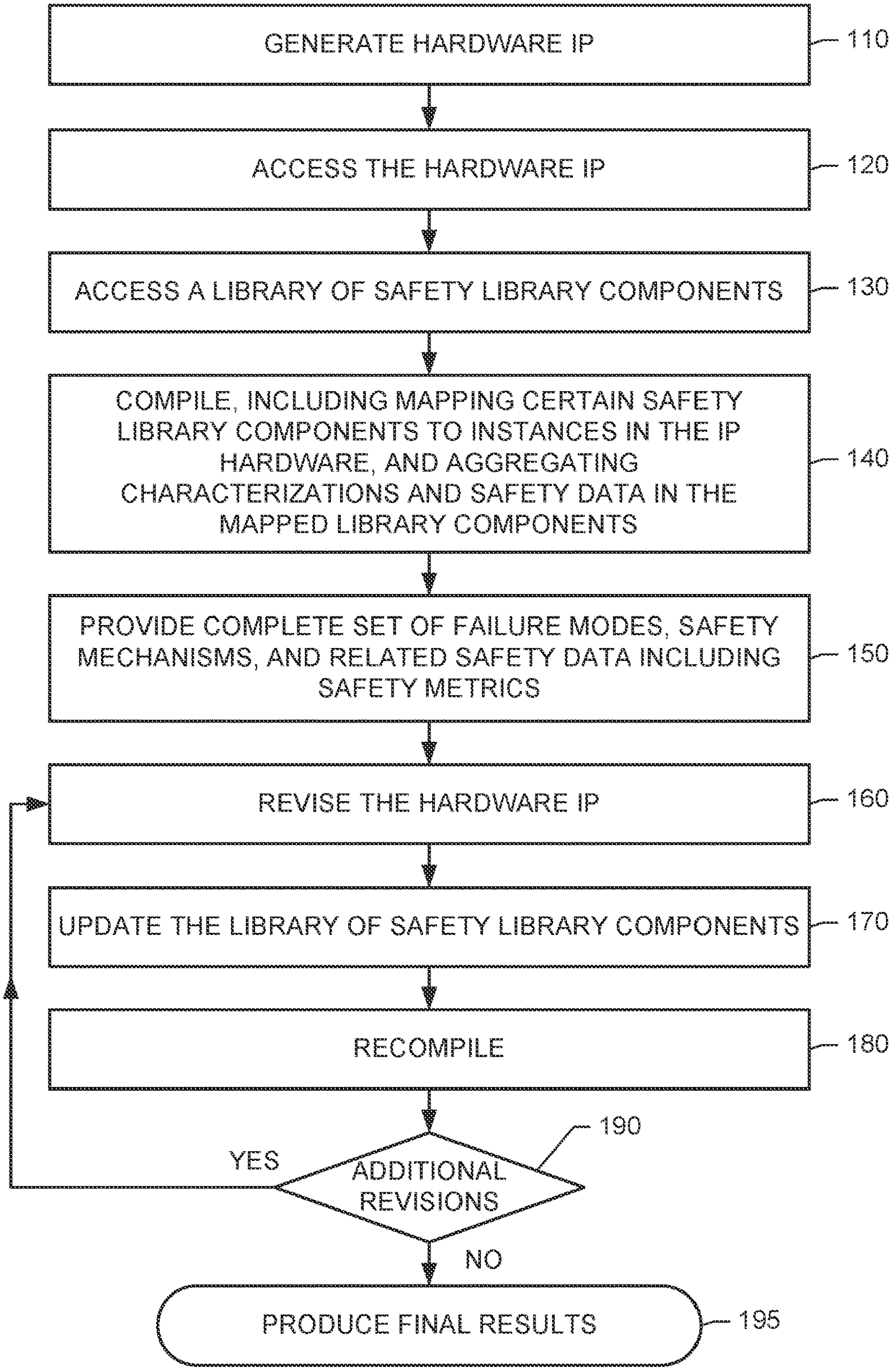
FIG. 1 is an illustration of a computer-implemented method of automatically performing Failure mode, effect and diagnostics analysis (FMEDA) on hardware intellectual property of an electronic system in accordance with the various accepts and embodiments of the invention.

The following describes various examples of the present technology that illustrates various aspects and embodiments of the invention. Generally, examples can be used to in any combination to describe aspects of the invention. All statements herein reciting principles, aspects, and embodiments (as well as specific examples thereof) are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms “a,” “an” and “the” include plural referents unless the context clearly dictates otherwise. Reference throughout this specification to “one embodiment,” “an embodiment,” “certain embodiment,” “various embodiments,” or similar language means that a particular aspect, feature, structure, or characteristic described in connection with the embodiment is included in at least one embodiment of the invention.

Thus, appearances of the phrases “in one embodiment,” “in at least one embodiment,” “in an embodiment,” “in certain embodiments," "in some embodiments," and similar language herein may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The terms "source," "master," and "initiator" refer to hardware intellectual property (IP) modules/blocks or units; these terms are used interchangeably within the scope and embodiments of the invention. As used herein, the terms "sink," "slave," and "target" refer to hardware IP modules or units and the terms are used interchangeably within the scope and embodiments of the invention. As used herein, a transaction may be a request transaction or a response transaction. Examples of request transactions include write request and read request.

In accordance with the various aspects and embodiments of the invention, failure mode, effects and diagnostic analysis of hardware IP is automated and model-driven. The hardware IP is not limited to any particular system. However, it is especially useful for complex electronic systems such as systems-on-chip (SoCs), which are highly configurable, and which might undergo multiple revisions during design.

As one example of a complex electronic system, a system-on-ship (SoC) includes a multiprocessor system that communicates through a network-on-chip (NoC). Hardware IP of the SoC includes instances of initiator IPs and target IPs. Transactions are sent from an initiator to one or more targets using industry-standard protocols. The initiator, connected to the NoC, sends a request transaction to a target or targets, using an address to select the target or targets. The NoC decodes the address and transports the request from the initiator to the target. The target handles the transaction and sends a response transaction, which is transported back by the NoC to the initiator. As such, the SoC and NoC include complexity and configurability.

Reference is made to FIG. 1, which illustrates a computer-implemented, model-driven method of automatically performing FMEDA on hardware intellectual property, in accordance with the various accepts and embodiments of the invention.

At block 110, hardware IP is generated. Consider hardware IP for a SoC. Requirements for the SoC are generated. The requirements may be dictated by marketing, sales, customer intent, etc. A system architect generates a specification that relates to the requirements. The specification provides a chip definition, technology, domains and layout for the IC system.

IP blocks or hardware models of components (e.g., processor core, memory, etc.) are selected from the architect's library. An IP block or hardware model may refer to a reusable unit of logic, cell, or integrated circuit layout design. The hardware models may be described at register transfer level (RTL) in a hardware description language such as Verilog).

Instances of the hardware models are assembled into top-level hardware IP. A hierarchy refers to connections of the hardware models.

Model-driven FMEDA is performed on the hardware IP to obtain subsystem and system level failure rates, failure modes and diagnostic capability.

At block 120, the hardware IP is accessed. For example, the hardware IP may be downloaded from remote storage via a network, read from local memory, etc.

At block 130, a library of safety library components is accessed, which is created by the user, such as the RTL designer or the safety engineer. For example, the library may be downloaded from remote storage via a network, read from local memory, etc. Each safety library component contains failure mode characterizations and safety data about a hardware IP block. Each safety library component also contains information that will enable it to be mapped to an IP block.

At block 140, the safety library components and the hardware IP are compiled. The compiling includes mapping or linking certain safety library components in the library to corresponding instances in the hardware IP; and aggregating the characterizations and safety data contained in the mapped safety library components of the corresponding components. In accordance with various aspects and embodiments, each safety library component is mapped to an instance (similar to RTL synthesis). In other words multiple instances can refer the same model and not the vice versa. For instance, the characterizations and safety data may be aggregated in data structure, such as an FMEDA table. When the compiling is completed, the FMEDA table has a complete set of failure modes, safety mechanisms and related safety data. In accordance with the aspects and embodiments of the invention, the internal format can have whatever format and language is suited to accommodate the compilation and the correct representation of the content of the FMEDA. When the FMEDA is exported, then it becomes a "table," which is typically a MS Excel format file. In accordance with the aspects and embodiments of the invention, the output may be a script that enables a third-party tool to generate the table and miss or skip the synthesis step. In this example, the script it is not a table but still describes a table, e.g. a failure mode may be represented like this:

create_failure_mode <ID> <description> <saftey data> etc.

If you have 100 failure modes you will have 100 of this commands.

At block 150, the aggregated characterizations and safety data are processed to provide complete set of failure modes, safety mechanisms, and related safety data including safety metrics. The metrics include system and component level Single Point Fault Metrics (SPFM), Latent Fault Metric (LFM) and the Probability Metric for HW random failure (PMFH).

Thus, this model-driven approach to FMEDA introduces a safety component library and a compiler for generating the FMEDA table or other structure that aggregates characterizations and safety data. The model-oriented approach is much faster and more efficient than manually cutting and pasting information into an FMEDA table. The increase in speed enables it to be performed at a high level of design. This is an important advantage.

The model-driven approach provides a way to characterize any hardware model regardless of the specific hardware element context. This allows for out-of-context safety characterization. In accordance with the aspects and embodiments of the invention, the mode-driven approach enabled reusability of such safety components.

The model-oriented approach realizes a significant advantage for an IP hardware that is highly configurable and undergoes multiple design revisions.

At block 160, the hardware IP is revised. There are a many possible reasons for revising the hardware IP. Requirements might be modified, rules might be violated, FMEDA results might be unacceptable, etc. As a result, hardware models might be moved in the IP hardware, functionality of a hardware model might be changed, instances of different hardware models might be added, instances of hardware models might be removed, etc.

In accordance with the aspects and embodiments of the invention, IP block revision changes are implemented. For example, a new NoC version implements a more advanced arbiter to manage the switch performance of the transportation matrix (new RTL model). The designer just adds a safety component to the library (without thinking about the context where this safety component will be instantiated in the FMEDA) and the FMEDA compiler updates the FMEDA removing the failure modes related to the old switch, and instantiating the one from the new safety component of the arbiter (the safety characterization) in the proper place of the FMEDA.

In accordance with the aspects and embodiments of the invention, IP reconfiguration is implemented. For example, a new NoC version is generated by changing a previous configuration: the previous configuration was connecting 4 initiator and 10 targets IPs, the new one adds 2 more targets and change from AHB to AXI the protocol of one initiator. This implies changing the protocol of one NoC interface and instantiate two more NoC interfaces for the two additional targets. In this case, all the safety component already exist in the library (these are configurable like the RTL models) and will be used by the FMEDA compiler that: a) will recover from the safety library the safety characterization of the NoC interface that implements the AXI instead of the AHB protocol; and b) will recover from the safety library the safety characterization of the two additional NoC interfaces. These additional failure modes from such characterization are place in the proper place of the FMEDA.

At block 170, the library of safety components is updated to reflect any changes to the IP blocks. In accordance with the aspects and embodiments of the invention, a new hardware model is contemplated; the library is update manually by the safety engineer (if required by the change) according to new hardware specifications provided by the designer.

At block 180, the revised hardware description and the updated library are accessed and recompiled. The recompiling includes reusing safety library components that are already mapped to instances whose hardware models that have not been changed in the revised description. That is, the mapping of unchanged hardware models to corresponding safety library components is reused. Reusing the safety library components is faster and more computationally efficient faster than remapping all of the instances in the IP description.

New mappings are performed for instances that have been added to the description and also for instances hose functionality has been changed. Mappings are deleted for instances that have been removed from the hardware IP and for mappings for instances whose functionality has changed.

At block 190, if additional revisions to the hardware IP are made, and FMEDA is desired, or if FMEDA is desired for some reason other than revisions, then control is returned to block 160. Once FMEDA has been competed, final results are made available (block 195). In accordance with the aspects and embodiments of the invention, revisions, in general, may be FMEDA reiterations that are needed due to: a) IP changes like new features added; b) IP reconfiguration; and/or c) derivation of an FMEDA for a new IP, which is derived from RTL models of others IP. In this example, a new FMEDA can be created by reusing safety libraries of others IP already existing in order to quickly compile the new FMEDA.

The method of FIG. 1 may be performed by a single party or by multiple parties. Consider the example of a system on chip. As a first example, the system architect performs blocks 110 and 160 (for example, generating the hardware IP or generating the RTL) and uses a tool that performs blocks 120-140 and 170-180. The library may be provided as part of the tool, or it could be maintained by the library owner and accessed remotely. As a second example, the system architect performs steps 110 and 160, and provides the IP hardware to a third party service, which performs blocks 120-140 and 170-180.

Another advantage of the model-driven approach is traceability. FMEDA is tightly connected with the actual design. Traceability against requirements and specifications is performed during the different phases (horizontal traceability). A method herein allows for the ability to link FMEDA, and others type of safety analysis like FMEA, DFA and FTA, along the execution of the complete SoC life cycle (vertical traceability). As such safety analysis evolves with the design evolution and change management (and safety design traceability) to ensure consistency along the design process.

Figure 2:
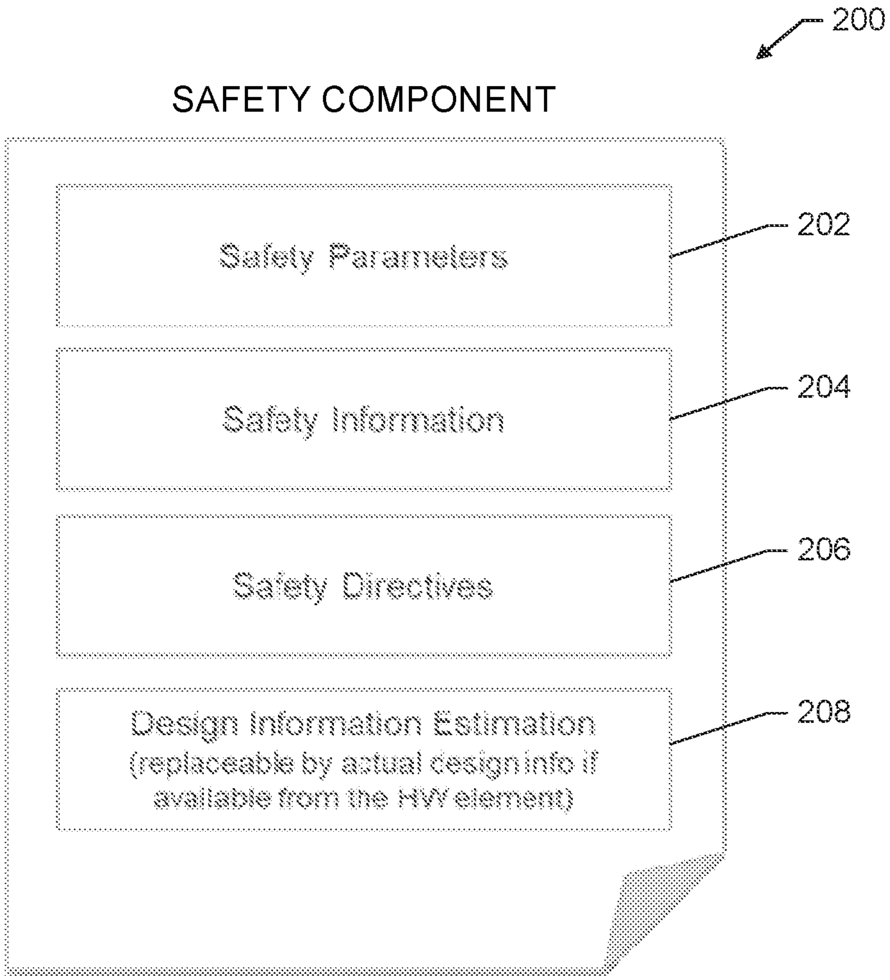
FIG. 2 is an illustration of a safety library component in accordance with the various aspects and embodiments of the invention.

Reference is now made to FIG. 2, which illustrates certain features of a safety library component 200. Each safety library component 200 contains attributes and safety values that derived from the safety characterization of hardware models. For example, a safety library component 200 of FIG. 2 may include safety parameters 202, which condition safety analysis.

In accordance with the aspects and embodiments of the invention, the safety analysis is the very first step in the logical process and the safety library doesn't exist yet. So the safety analysis is a separated process and is done by analyzing the specifications of the IP, elaborating on the specifications of the IP, and transposing the specifications of the IP in a scalable safety characterization implemented into the safety component. The safety component's language and semantic will allow describing such safety characterization in a way that can be effectively used by the FMEDA synthesis (i.e. in a scalable way).

The safety library component 200 of FIG. 2 may also include safety information 204 and safety directives 206. The safety directives may include the name or names of safety mechanisms. A safety mechanism is responsible for detecting the occurrence of its associated failure mode.

The attributes provide a description of each failure mode, attributes of each failure mode, safety mechanisms for each failure mode, and safety values for each failure mode. The attributes and the safety values for a failure mode may be similar to the type of information found in a row a standard FMEDA table. For example, the attributes might include text descriptions of a failure mode, a reason for the failure, and a consequence of the failure. The attributes may also include whether the failure mode is safety relevant, and whether failure affects a specific set of metrics. The attributes may further include a property to guide how certain safety values are processed to produce a safety metric.

In accordance with the aspects and embodiments of the invention, one aspect of the automation is able to "parametrize" or to condition the safety metrics result according to the actual hardware shown as the parameters of FIG. 2. In accordance with the aspects and embodiments of the invention, a parameter determines if a specific failure mode (a row) is present or not. In accordance with the aspects and embodiments of the invention, a parameter could condition the value of the diagnostic coverage (attribute) of a specific failure modes.

The safety values are numerical values of probabilities related to the associated failure mode. Examples of safety values include, without limitation, failure mode distribution (e.g., if a failure mode occurs, what percentage of logic will fail); capability of the safety mechanism to detect a specific failure (e.g., percentage of time that the safety mechanism will detect the specific failure); and percentage representing safeness of failure (e.g., 20% if 2K out of 10K gates are safe during the specific failure).

The safety library component 200 of FIG. 2 also includes safety directives 206, which provide information that enable the library safety component 200 to be mapped to an instance of a hardware model. In accordance with the aspects and embodiments of the invention, directives support the automation and in particular support creating the "link" between the safety component and the RTL model (the counterpart). In accordance with the aspects and embodiments of the invention, a safety component will contain information (directive) that explains to which RTL model the safety component is associated. For example the safety component ALU shall be associated to the RTL model alu32bits (in file alu32bits.v). This method allows easy reassign of the same safety component to another implementation: alu32bits_fast.

In accordance with the aspects and embodiments of the invention, inside a safety component there are multiple failure modes. In order to automate the calculation of the safety data and, hence the final metrics, every failure mode or fault metric (FM) shall be mapped to a specific design block (typically small). This mapping operation creates the relation between every FM and the correspondent design block that is the "root cause of the FM", i.e. the pool of gates that, if failing, generate that FM. Thus, once this information is into the safety component, the mapping for a specific IP, includes its reiterations and adaptations that are triggered by changes. This is one of the most problematic and tricky operations that is done manually. Thus, the process of getting the information into a safety component and automating the mapping is a valuable aspect of the present invention, which is done automatically by the tool to improve the FMEDA productivity.

The safety component 200 may also include design information estimation 208. Examples of the design information include, but are not limited to, gate count, sequential elements, and memory bits.

The safety library components may be supported by a specific safety language (semantic) that is able to describe the safety parameters 202, safety information 204, safety directives 206 and design information estimation 208.

Figure 3:
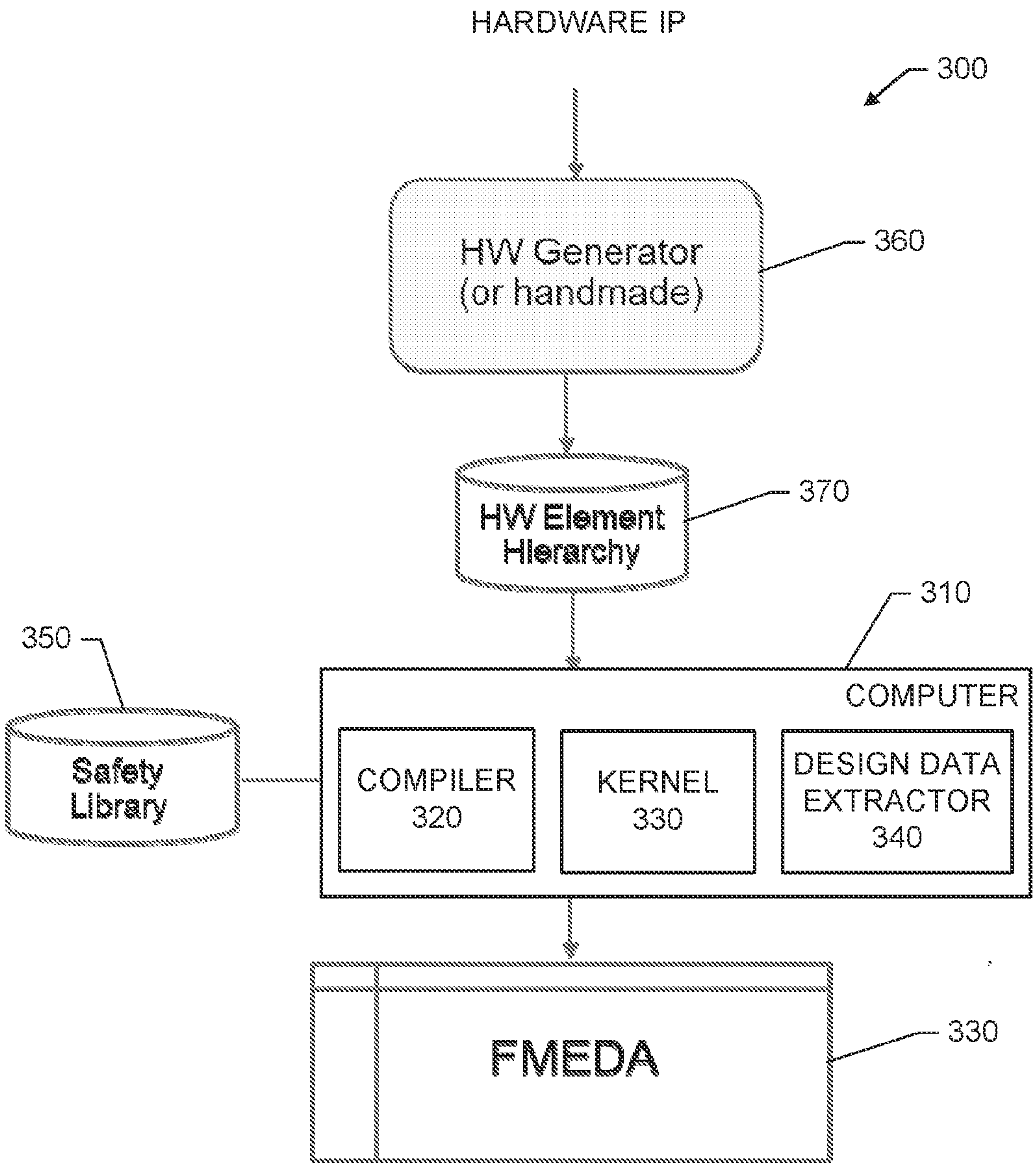
FIG. 3 is an illustration of a system including a tool for performing FMEDA in accordance with the various aspects and embodiments of the invention.

Reference is now made to FIG. 3, which illustrates a system 300 including a tool for performing FMEDA on IP hardware. The tool includes a computer 310 that is programmed to execute a compiler 320. The compiler 320 may perform the functions of blocks 120, 130, 140, 170 and 180 of FIG. 1. The compiler 320 produces an FMEDA table 330. In accordance with the aspects and embodiments of the invention, a table includes a script containing third-party commands and the scripts still describe a table format. This script could be consumed or used by a tool to generate a MS Excel table or a graphical user interface (GUI) representation of the table.

In some embodiments, the computer 310 may also be programmed with a safety kernel 340 that performs the function of block 150 of FIG. 1. The kernel 340 may calculate safety data to populate the FMEDA 305 table and calculate global safety metrics.

The system 300 further includes one or more safety component libraries 350 (there could be multiple safety libraries 350), which is accessed by the compiler 320. A library 350 may be stored in remote or local database.

The system 300 may further include a hardware generator 360 for receiving a hardware configuration, generating a hardware hierarchical representation of instances of hardware models, and storing the hierarchical representation in a database 370. The compiler 320 also accesses the hierarchical representation from the database 370.

In accordance with the aspects and embodiments of the invention, database 370 is the IP RTL models, such as when a tool synthetizes an RTL design to produce a gate level information. The hierarchy is implicit in the RTL models and can be built by the FMEDA compiler. The hierarchy, like in RTL synthesis, is needed to understand at what point of the design that tool instantiates some physical elements, such as in the case of FM, because the safety data of those FMs depend on the context, e.g. the same safety component instantiated twice—in different points of the design hierarchy—will inherit different gate counts, thereby generating different safety data despite the FM description being the same. The gate count extraction is done by a design data extractor 340. In accordance with the aspects and embodiments of the invention, the design data to be extracted includes: gate counts, sequential cells counts, and memory bits.

The computer 310 may be further programmed with the design data extractor 340. A safety component 200 may contain information about the number of gates that will be used to implement a hardware model. For instance, the percentage representing safeness may indicate the total number of gates, or the design information 208 might indicate the number of gates. The design data extractor 340 uses this information to produce a better estimate of a gate count and an area.

In accordance with the aspects and embodiments of the invention, the design data (e.g. gates count) contained into the safety component are safety engineer estimations, which are provided during the compilation of the library, and are used if a design data extractor 340 is not used. This enables FMEDA exploration to determine an estimate of counts and without a design data extractor 340, the FMEDA accuracy is lower. When a design data extractor 340 is used to extract gate counts from the RTL files is determined and replaces the estimation into the safety components.

In accordance with the aspects and embodiments of the invention, a design data extractor 340 can be a gate counts extractor implemented into the FMEDA compiler (quick design synthesis) or an RTL synthesis tool, which can be connected.

An example will now be provided. In this example, hardware IP blocks in hierarchical form are accessed by the compiler 320. The compiler 320 also accesses the safety component library 350 and the hierarchical representation, and performs the compiling to generate the FMEDA table 320.

Figure 4:
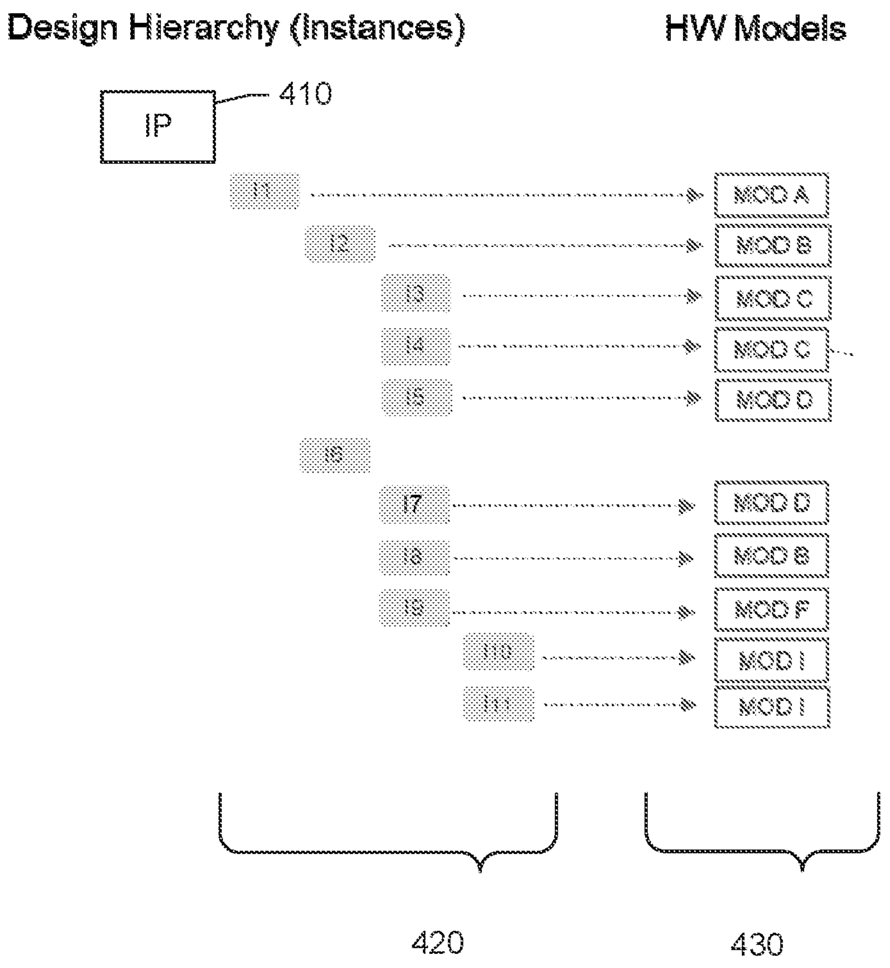
FIG. 4 is an illustration of a hierarchical representation of hardware intellectual property (IP) in accordance with the various aspects and embodiments of the invention.

Reference is now made to FIG. 4, which illustrates a hierarchical representation 400 of a hardware IP 410. The hardware IP 410 is represented as a hierarchy of instances of hardware models. The instances of the hardware models are is graphically shown with an indent of the hierarchical inferentiation 420 (I1, I2, . . . I11) that are mapped to hardware models 430 (MOD A, MOD B, . . . MOD I) for realizing complex hardware functions. Every inferentiation is an instance that uniquely refers to a specific hardware model for a hardware element. The hardware models include hardware functional behavior (e.g., design specification, systemC, System Verilog, Verilog, VHDL). In accordance with some accepts and embodiments of the invention, the hardware models also include design information (e.g., number of gates, sequential cell and memory bits), which is used, when available, to increase the accuracy of the safety data as described above. In accordance with some accepts and embodiments of the invention, the resulting design hierarchy represents a connection of hardware models instances, according to the specific function to implement, enhanced by hardware model design information, when the information exists.

Figure 5:
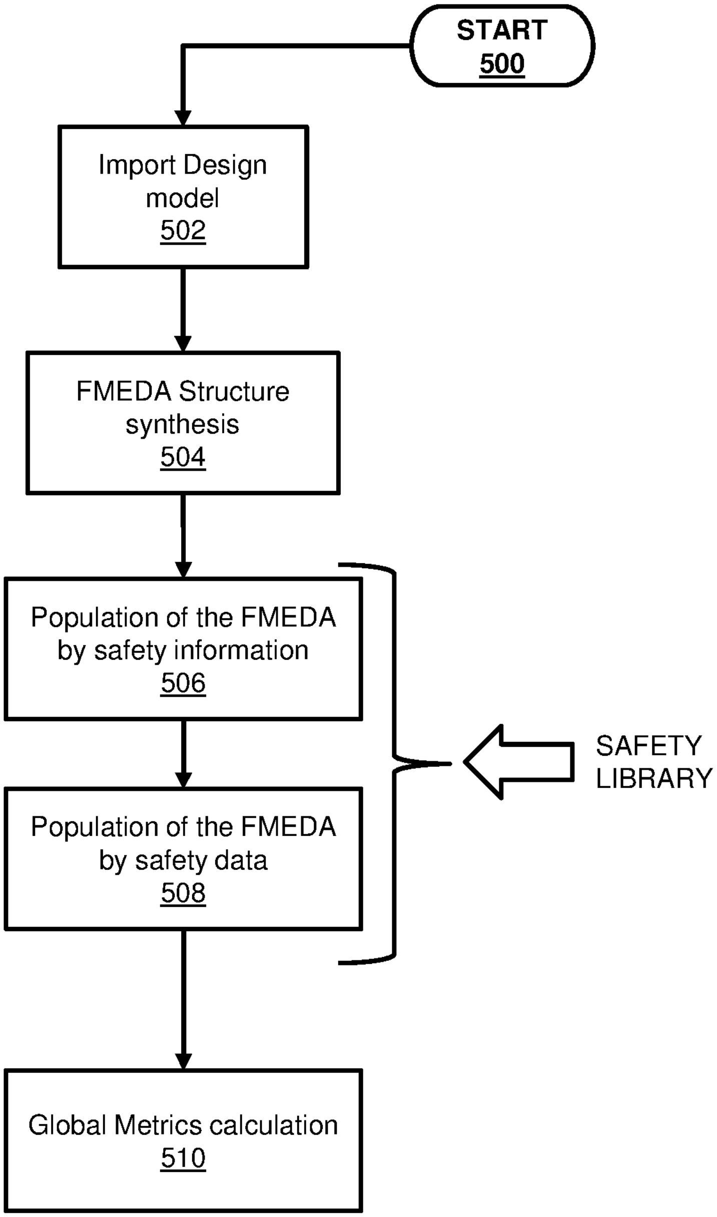
FIG. 5 is an illustration of a computer-implemented method of performing FMEDA in accordance with the various aspects and embodiments of the invention.

Additional reference is made to FIG. 5, which shows a process 500 for the compiler 310 that executes code in accordance with some aspects and embodiments of the invention. At step 502, the compiler 310 imports, receives or accesses the full design models. At step 504 an FMEDA structure is synthesized. In accordance with the aspects and embodiments of the invention, the structure represents a table and that at this point the compiler or tool has determined the size, according to the actual IP hardware (e.g. 200 rows, i.e. FMs) and the tool knows, for every row, which safety component shall be assigned. In the successive step the rows, now empty, are populated with data as shown in steps 506 and 508. At step 506, the FMEDA table 330 is populated using safety information retrieved from or access at a safety library. At step 508, the FMEDA table 330 is populated using the safety data retrieved from or accessed at the safety library 350. At step 510, the compiler 310 or other tool determines or calculates global metrics for the design.

Changes applied to hardware IP, because of hardware design modification, are affecting its design hierarchy and they are automatically reflected by re-running the compiler. Hardware elements modifications include both hardware configuration changes as well as inclusion/exclusion of new/existing functionalities (design reconfiguration, design enhancement, design derivation, etc.).

Certain methods according to the various aspects of the invention may be performed by instructions that are stored on a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A computer-implemented method of performing failure mode, effects and diagnostic analysis (FMEDA) on hardware IP of an electronic system, the method comprising:

accessing a library of safety library components, each safety library component including failure mode characterizations and safety data about a hardware model and names of safety mechanisms responsible for detecting occurrence of a failure metric and an associated root cause of the failure metric; and compiling the safety library components and the hardware IP, including mapping instances of hardware models in the hardware IP to corresponding safety library components and aggregating the failure mode characterizations and safety data of a corresponding components.

2. The method of claim 1, wherein each safety library component contains attributes and safety values.

3. The method of claim 1, wherein each safety library component includes information for mapping to a hardware model; and wherein mapping the safety library components to the hardware IP includes accessing the mapping information in the library components.

4. The method of claim 1, further comprising generating global metrics from the aggregated characterizations and safety data.

5. The method of claim 1, further comprising:

receiving a revised hardware IP; and recompiling the safety library components and the revised hardware IP.

6. The method of claim 5, wherein the recompiling includes reusing components that are mapped to instances that have not changed in the revised hardware IP.

7. The method of claim 5, wherein the recompiling includes demapping safety library components that correspond to instances that were removed from the revised hardware IP.

8. The method of claim 5, wherein the recompiling includes demapping safety library components mapped to instances having revised functionality in the revised hardware IP, and mapping new safety library components to the instances having the revised functionality.

9. The method of claim 1, wherein each safety library component includes safety values and design data; and wherein the method further comprises extracting the safety values and design data to produce estimates of gate count and area.

10. The method of claim 1, wherein the hardware IP and the library are for a system-on-chip.

11. An article comprising non-transitory electronic memory encoded with data, which when executed, causes a computing platform to perform failure mode, effects and diagnostic analysis (FMEDA) on hardware intellectual property (IP) of an electronics system, the FMEDA including the steps of:

referencing a library of safety library components, each safety library component including failure mode characterizations and safety data about a hardware model and names of safety mechanisms responsible for detecting occurrence of a failure metric and a root cause of the failure metric; and compiling the safety library components and the hardware IP, including mapping instances in the hardware IP to corresponding safety library components, and aggregating the failure mode characterizations and safety data of the mapped components.

12. A synthesis tool comprising:

memory; and a processing unit, wherein the memory stores code that is executed by the processing unit to cause the tool to perform failure mode, effects and diagnostic analysis (FMEDA) on intellectual property (IP) including:

accessing a safety component library, each component in the library having failure mode characterizations and safety data about a model representation of the IP, wherein calculation of the safety data includes a final metric that is included in the library and the final metric includes a mapping to a specific design block; and compiling the safety component library and the IP, the compiling including:

mapping instances in the IP to corresponding safety library components; and aggregating the failure mode characterizations and safety data of the mapped components.

* * * * *